United States Patent [19]
Ito

[11] 3,818,535
[45] June 25, 1974

[54] WIPER DEVICE FOR VEHICLES
[76] Inventor: Isao Ito, Kamezakitakanecho-8-chome, Handa, Japan
[22] Filed: Aug. 1, 1972
[21] Appl. No.: 277,045

[30] Foreign Application Priority Data
Sept. 4, 1971   Japan............................. 46-68420

[52] U.S. Cl. ........................................... 15/250.23
[51] Int. Cl. ............................................. B60s 1/36
[58] Field of Search....... 15/250.23, 250.21, 250.13, 15/250.15, 250.22, 250.32, 250.35

[56] References Cited
UNITED STATES PATENTS

| | | | |
|---|---|---|---|
| 2,079,399 | 5/1937 | Drew et al. | 15/250.23 |
| 2,591,091 | 4/1952 | O'Connor | 15/250.23 |
| 2,820,238 | 1/1958 | Roth et al. | 15/250.23 |
| 3,045,272 | 7/1962 | Oishei | 15/250.35 X |
| 3,047,900 | 8/1962 | Scinta | 15/250.35 X |
| 3,453,679 | 7/1969 | Thorlakson | 15/250.23 X |
| 3,466,694 | 9/1969 | Feldstein | 15/250.35 |
| 3,660,862 | 5/1972 | Scinta | 15/250.23 |

FOREIGN PATENTS OR APPLICATIONS

| | | | |
|---|---|---|---|
| 1,517,083 | 2/1968 | France | 15/250.23 |

*Primary Examiner*—Leon G. Machlin
*Attorney, Agent, or Firm*—Cushman, Darby & Cushman

[57] ABSTRACT

A wiper blade is mounted to an end of a wiper arm which is driven to swing on the surface of a windshield of the vehicle. The wiper arm is divided into two members which are pivotally connected with each other so that the arm may be bent at the point of connection. The arm is bent at the point by the friction between the wiper blade and the surface of the windshield, so that the wiper blade may be in parallel to both the side edge and the lower bottom edge of the front glass so as not to obstruct the driver's view of the side mirror.

1 Claim, 5 Drawing Figures

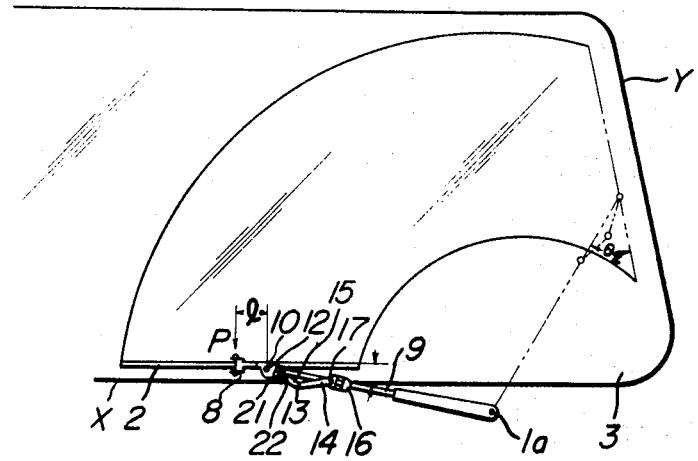
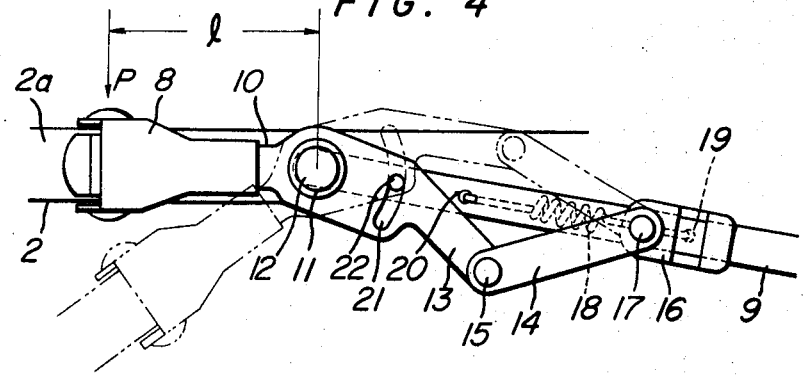
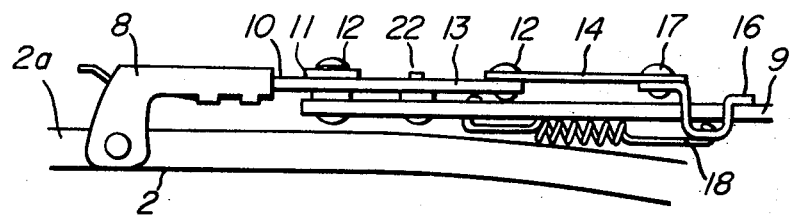

WIPER DEVICE FOR VEHICLES

This invention relates to a wiper device for vehicles, and more particularly to an improved wiper device for vehicles which effectively wipes the windshield thereof.

Figure 1:
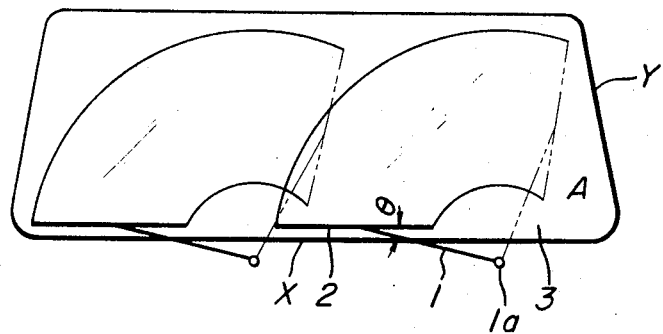
Figure 2:
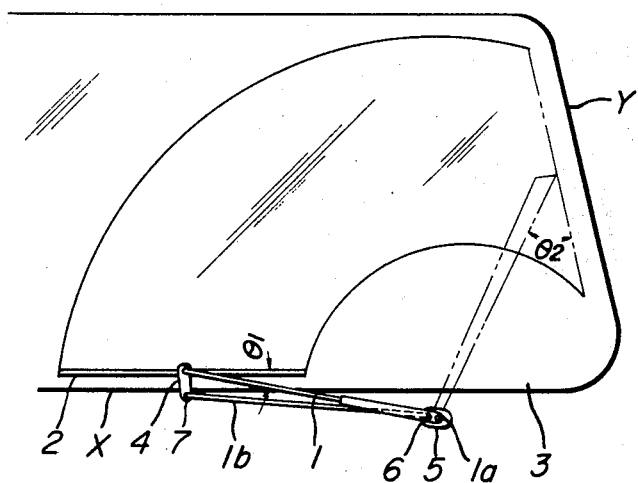

In the general wipers for vehicles, there has been a great disadvantage that the whole area of the windshield cannot be wiped. Although an improvement has been made in the wiper for wiping the whole area of the windshield, the construction is so complicated that is is liable to obstruct the driver's view. These prior arts will be described in more detail with reference to the accompanying drawing in which:

FIG. 1 is a front view of the windshield of a vehicle in which the conventional wiper blades are provided, and FIG. 2 is a partial front view showing an example of the prior art improvement of a wiper which wipes the whole area of the windshield.

Referring to FIG. 1 showing the conventional wiper device, a pair of wiper blades 2 are mounted to a pair of wiper arms 1 respectively. The wiper blade 2 is fixed to the free end of the wiper arm 1 which is pivotally mounted at a pivot 1a and swung about the pivot 1a by means of a linkage connected to a wiper motor (not shown) to wipe the surface of the windshield 3. In such a construction, wherein the wiper blade 2 is fixed to the wiper arm 1, the angle $\theta$ made between the wiper blade 2 and the arm 1 is always constant and accordingly the blade 2 does not become parallel to the side edge Y of the windshield 3. Therefore, there is left an area A unwiped at the right below corner of the windshield on the driver's side. The unwiped corner A will obstruct the driver's view, especially the view of the side mirror on the driver's side. The above mentioned insufficient wipe of the windshield has been a problem in the safety driving.

An improvement of the conventional wiper in which the insufficient wipe is improved is shown in FIG. 2, wherein the members or elements equivalent to those shown in FIG. 1 are all indicated with the same reference numeral or character. Referring to FIG. 2, a wiper blade 2 is pivotally mounted to a wiper arm 1 which is in turn pivotally mounted at a pivot 1a to the body of the vehicle. In a stay 5 including the pivot 1a is provided another pivot or pin 6 to which an auxiliary arm 1b is mounted at one end thereof. The other end of the auxiliary arm 1b is connected with a pin 7 fixed at an end of a projected member 4 integrally fixed to the wiper blade 2. The angle between the wiper blade 2 and the wiper arm 1 changes from $\theta_1$ to $\theta_2$ as the wiper arm 1 swings about the pivot 1a, since the projected member 4 is integrally fixed to the wiper blade 2 and the stay 5 is fixed to the body of the vehicle to form a quadrilateral with the arm 1, the auxiliary arm 1b, the projected member 4 and the stay 5. Therefore, it is possible to wipe the windshield from the lower edge X up to the side edge Y thereof as shown in FIG. 2 with a chain line. However, in this construction as shown in FIG. 2, there are disadvantages that the number of parts of the wiper device is large, the wiper arm construction 1 and 1b is too marked and stands out in the front glass, the design of the body is spoiled thereby and the driver's view is considerably obstructed thereby at the time of operation thereof.

It is therefore a primary object of the present invention to provide an improved wiper device which has a simple construction and effectively wipes the whole area of the windshield.

Another object of the present invention is accordingly to provide a wiper device which will not obstruct the driver's view when it is operated.

Still another object of the present invention is to provide a wiper device which is made of a small number of parts and accordingly will not spoil the design of the body of the vehicle.

A further object of the invention is accordingly to provide a wiper device which has a single arm of simple design and can be manufactured at a low cost.

Another important object of the present invention is to provide a wiper device in which the wiper blade becomes in parallel both to the side edge and bottom edge of the front glass.

Other objects, features and advantages of the present invention will be made apparent and the above objects will be made more explicit from the following detailed description of the present invention with particular reference to a preferred embodiment thereof taken in conjunction with the accompanying drawing in which:

FIG. 3 is a partial front view showing the wiper device in accordance with the present invention together with the trace of wipe by the wiper blade thereof, FIG. 4 is an enlarged partial front view of the main portion of the wiper device in accordance with the present invention shown in FIG. 3, and FIG. 5 is an enlarged partial bottom view of the main portion of the wiper device shown in FIG. 4.

In order to accomplish the above objects of the invention, the wiper device in accordance with the present invention comprises a wiper blade and a bendable wiper arm which is bent in a direction parallel to the surface of the windshield of the vehicle. The bendable wiper arm consists of two arm members one of which is fixed to the wiper blade and the other of which is swingably mounted at a pivot to the body of the vehicle, and the two members are pivotally connected with each other. The bendable arm is bent at the pivot for connection of the two arm members in both directions parallel to the surface of the windshield by the friction between the wiper blade and the surface of the windshield.

Now referring to FIG. 3 showing an embodiment of the present invention, a wiper blade 2 of the same shape and construction as that of the prior art is provided with a coupling metal fixture 8 pivotally fixed therewith. Referring to FIG. 4, the cylindrical metal fixture 8 is pivotally mounted to a blade holder 2a. The wiper arm comprises a driving side arm member 9 and a blade side member 10 which are pivotally coupled with each other by means of a rivet 12 and a bearing member 11 fitted to a hole provided in the blade side member 10 so that the two arm members 9 and 10 may be bent at the rivet 12 in a direction parallel to the surface of the windshield 3. The blade side arm member 10 is provided with a projected portion 13 integrally fixed thereto. The end of the projected portion 13 is rotatably connected with an end of a coupling member 14 by means of a pin 15. The other end of the coupling member 14 is rotatably connected with a spring fixture 16 by means of a pin 17. The spring fixture 16 is slidably mounted on the driving side arm member 9 and provided with a hole 19 for holding an end of a tension spring 18. An end of the tension spring 18 is engaged with the hole 19 provided in the spring fixture 16 and the other end of the tension spring 18 is engaged with a hole 20 provided in the driving side arm member 9. The projected portion 13, the coupling member 14, the spring fixture 16 and the tension spring 18 constitute a wiper operating mechanism for controlling the bending of the wiper arm. Further, the blade side arm member 10 is provided with an arcuate slot 21 for controlling or limiting the bending of the wiper arm in which a projection 22 fixed on the driving side arm member 9 is inserted to slide therealong. The blade side arm member 10 is inserted into said cylindrical metal coupling fixture 8 to be combined with the blade 2.

Now the operation of the wiper device in accordance with the present invention will be described hereinbelow. When the wiper arm and blade 2 start to move from the position shown in solid line in FIGS. 3 and 4, a friction load P made by the friction between the wiper blade 2 and the surface of the windshield 3 effects on the point of connection of the blade 2 and the coupling fixture 8 which is at the center of the blade 2.

Accordingly, a torque of $P.l$, the product of the friction load P and the distance $l$ from the center of the wiper blade 2 to the center of the rivet 12, acts about the rivet 12 and makes the blade side arm member 10 rotate in the counterclockwise direction about the rivet 12 up to a position where the projection 22 reaches the end of the arcuated slot 21 as shown with chain lines in FIG. 4. Thus, the wiper arm is bent as shown in FIG. 4 with the chain lines. Therefore, the angle made between the wiper blade 2 and the driving side wiper arm member 9 is changed from $\theta_1$ to $\theta_2$ automatically when the wiper blade 2 swings from the lower position to the upper position, and accordingly, the blade 2 becomes in parallel to the side edge Y of the windshield when the blade 2 comes close thereto. Thus, the area unwiped is much decreased in comparison with the area in case of the conventional wiper device as shown in FIG. 1.

Then, when the wiper arm and the blade 2 returns from the upper limit position, the torque made by the friction load between the blade 2 and the glass surface 3 effects to rotate the blade side arm member 10 in the opposite direction, clockwise, and accordingly the angle between the blade 2 and the driving side arm member 9 changes from $\theta_2$ to $\theta_1$ automatically. As described hereinabove, the angle between the wiper blade 2 and the driving side arm member 9 is different when it is at the upper limit position from that when it is at the lower limit position. Therefore, the same function as that of the improved conventional wiper device with an auxiliary arm shown in FIG. 2 can be performed by the embodiment of the present invention.

In the wiper arm and blade in accordance with the present invention performing a reciprocal swing motion as described above, there is a fear of malfunction of the wiper blade that the blade will return to its original position by a too large inertia in such cases where the velocity of the wiper movement is so large as to make a large inertia and the surface of the windshield 3 is so wet as to make a small friction since the angular velocity of the wiper arm decreases after it passes the central portion of the wiping range. Said wiper operating mechanism for controlling the bending of the wiper arm acts to eliminate such a malfunction. That is, when the wiper arm is bent as shown with the chain line and the blade 2 passes the central portion of the wiping range, and the torque by inertia effects to rotate the blade side arm member 10 clockwise, the tension spring 18 prevents the rotation of the arm member 10 by its tension through the fixture 16, the coupling member 14 and the projected portion 13. Thus, the blade side arm member 10 does not return to its original position until the wiper arm reaches the upper limit of the wiping range. Further, when the wiper arm returns from its upper limit, the friction between the windshield and the wiper blade is large enough with respect to the inertia to rotate the wiper blade clockwise overcoming the tension of the tension spring 18. Therefore, the bending of the wiper arm in the opposite direction at the time of return thereof is not prevented by said mechanism.

In accordance with the present invention as described hereinabove, the wiper arm is bent in the direction parallel to the surface of the windshield by a torque caused by the friction between the blade and the windshield according to the specific construction of the wiper device wherein the wiper arm is bendable at a point, and accordingly, the angle made between the wiper blade and the wiper arm (the driving side arm member 9 in the embodiment) changes as the wiper operates and the windshield is effectively wiped thereby. Therefore, the same function as that of a conventional improved wiper device with an auxiliary arm can be performed without an auxiliary arm, the cost of the device can be considerably lowered, the design is not spoiled thereby and the driver's view is not obstructed at all, in accordance with the present invention. Further, there is a great advantage that the conventional wiper blade can be used in the wiper device in accordance with the present invention, since the construction of coupling for connection of the wiper blade in the wiper device of the invention can be made the same as that of the general conventional wiper devices.

What is claimed is:

1. A wiper device for vehicles comprising in combination a wiper blade, a wiper arm having said wiper blade coupled thereto, said wiper arm being divided into a first arm member and a second arm member, said first and second arm members being rotatably coupled to one another by means of a pin, said second arm member including an elongated slot with which a second pin fixed to said first arm member is engaged, said second arm member being bendable in a direction parallel to the side edge surface of the windshield of the vehicle toward which the wiper arm is moving, and wherein said wiper arm is provided with a wiper operating mechanism for controlling the bending of the wiper arm, said mechanism comprising a coupling member pivotally connected at one end thereof to a portion of said second arm member, a fixture member slidably mounted on said first arm member, and a tension spring tensioned between said slidable fixture member and a portion of said first arm member.

* * * * *